(12) United States Patent
Gowda (10) Patent No.: US 10,486,825 B2
(45) Date of Patent: Nov. 26, 2019

(54) SYSTEMS AND METHODS FOR MANAGING CENTER OF GRAVITY

(71) Applicant: HONEYWELL INTERNATIONAL INC., Morris Plains, NJ (US)

(72) Inventor: Sushma Gowda, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 331 days.

(21) Appl. No.: 15/377,107

(22) Filed: Dec. 13, 2016

(65) Prior Publication Data

US 2018/0162546 A1 Jun. 14, 2018

(51) Int. Cl.
*B64D 43/00* (2006.01)
*G06F 3/14* (2006.01)
*G01M 1/12* (2006.01)
*G06F 3/0482* (2013.01)
*G01C 21/00* (2006.01)

(52) U.S. Cl.
CPC .............. *B64D 43/00* (2013.01); *G01C 21/00* (2013.01); *G01M 1/127* (2013.01); *G06F 3/0482* (2013.01); *G06F 3/14* (2013.01)

(58) Field of Classification Search
None
See application file for complete search history.

(56) References Cited

U.S. PATENT DOCUMENTS

| | | | |
|---|---|---|---|
| 3,701,279 A | 10/1972 | Harris et al. | |
| 4,937,754 A * | 6/1990 | Buisson | G01M 1/127 |
| | | | 701/124 |
| 7,954,766 B2 | 6/2011 | Brainard et al. | |
| 8,226,040 B2 | 7/2012 | Neto | |
| 9,361,486 B2 | 6/2016 | McDonough et al. | |
| 10,082,439 B1 * | 9/2018 | Helppi | G01M 1/127 |
| 2014/0222325 A1 * | 8/2014 | Followell | G01M 1/125 |
| | | | 701/124 |
| 2017/0124734 A1 * | 5/2017 | Gowda | G06T 11/20 |

OTHER PUBLICATIONS

Extended EP Search Report for Application No. 17205923.0 dated Apr. 13, 2018.

* cited by examiner

*Primary Examiner* — Thomas G Black
*Assistant Examiner* — Ana D Thomas
(74) *Attorney, Agent, or Firm* — Lorenz & Kopf, LLP (57) ABSTRACT

Systems and methods for managing a center of gravity of a vehicle on a display associated with the vehicle are provided. The method includes: determining an initial value of a center of gravity prior to a start of a journey, and receiving a value for a consumption of a fuel for the journey; determining, by a processor, a change in the center of gravity at each waypoint based on the initial value and the fuel consumed; generating a first user interface that illustrates the center of gravity at the waypoints over the journey and that illustrates that the change in the center of gravity exceeds a predefined threshold; based on the change in the center of gravity exceeding the predefined threshold, generating, a second user interface that provides a selection to bring the center of gravity below the predefined threshold; and updating the first user interface based on the selection.

16 Claims, 7 Drawing Sheets

SYSTEMS AND METHODS FOR MANAGING CENTER OF GRAVITY

TECHNICAL FIELD

The present disclosure generally relates to vehicles, such as aircraft, and more particularly relates to systems and methods for managing a center of gravity of the aircraft on a display associated with the aircraft.

BACKGROUND

Vehicles, such as aircraft, have a center of gravity. Generally, in the example of an aircraft, the aircraft is required to maintain the center of gravity within an acceptable range throughout the flight of the aircraft. The aircraft may have an acceptable limit for a forward center of gravity and an acceptable limit for an aft center of gravity, each of which may be required to be within these acceptable limits during flight. In certain instances, due to changes in passenger, fuel or cargo loads, the forward or aft center of gravity may need to be managed by the pilot during flight to ensure the forward and aft center of gravities are each maintained within the respective acceptable limits during flight. The management of the forward and aft center of gravities, however, may increase the pilot's workload.

Accordingly, it is desirable to provide improved systems and methods for managing a center of gravity of a vehicle, such as an aircraft, in which the center of gravity is managed through a display of the vehicle. Moreover, it is desirable to provide a graphical indicator of the center of gravity on a display of the vehicle to inform the pilot of changes in the center of gravity throughout the flight of the aircraft. Furthermore, other desirable features and characteristics of the present invention will become apparent from the subsequent detailed description and the appended claims, taken in conjunction with the accompanying drawings and the foregoing technical field and background.

SUMMARY

In accordance with various embodiments, provided is a method for managing a center of gravity of a vehicle on a display associated with the vehicle. The method includes: determining an initial value of a center of gravity for the vehicle prior to a start of a journey having a plurality of waypoints, and receiving a value for a consumption of a fuel by the vehicle between each waypoint of the journey from a source of data associated with the vehicle; determining, by a processor, a change in the center of gravity of the vehicle at each waypoint of the journey based on the initial value of the center of gravity and the fuel consumed between each waypoint; generating, by the processor, a first user interface for display on the display that illustrates the center of gravity of the vehicle at one or more of the plurality of waypoints over the journey and that illustrates that the change in the center of gravity for at least one of the one or more of the plurality of waypoints exceeds a predefined threshold; based on the change in the center of gravity for the at least one of the plurality of waypoints exceeding the predefined threshold, generating, by the processor, a second user interface for display on the display that provides a selection to bring the center of gravity below the predefined threshold at the at least one of the plurality of waypoints; and updating, by the processor, the generated first user interface based on a receipt of the selection.

Further provided according to various embodiments is a system for managing a center of gravity of a vehicle on a display associated with the vehicle. The system includes a source of a position of the vehicle and a source of journey data and fuel consumption data for the vehicle along the journey. The journey has a plurality of waypoints. The system also includes a processor onboard the vehicle and in communication with the display, and the processor: determines a center of gravity of the vehicle at each waypoint of the journey based on an initial value of a center of gravity and the fuel consumption data; generates first user interface data that indicates the center of gravity of the vehicle at each of the plurality of waypoints over the journey and that indicates that the center of gravity for at least one of the plurality of waypoints exceeds a predefined threshold; renders a first user interface on the display based on the first user interface data; determines the position of the vehicle on the journey; generates, based on the position of the vehicle and the center of gravity for the at least one of the plurality of waypoints exceeding the predefined threshold, second user interface data that provides a selection to bring the center of gravity below the predefined threshold at the at least one of the plurality of waypoints; renders a second user interface on the display based on the second user interface data; and updates the generated first user interface based on a receipt of the selection.

Also provided according to various embodiments is a computer program product for processing a digital signal. The computer program product includes a tangible storage medium readable by a processing circuit and storing instructions for execution by the processing circuit for performing a method for managing a center of gravity of a vehicle on a display associated with the vehicle. The method including: determining an initial value of a center of gravity for the vehicle prior to a start of a journey having a plurality of waypoints, and receiving a value for a consumption of a fuel by the vehicle between each waypoint of the journey from a source of data associated with the vehicle; determining a change in the center of gravity of the vehicle at each waypoint of the journey based on the initial value of the center of gravity and the fuel consumed between each waypoint; generating a first user interface for display on the display that illustrates the center of gravity of the vehicle at each of the plurality of waypoints over the journey and that illustrates that the change in the center of gravity for at least one of the plurality of waypoints exceeds a predefined threshold; based on the change in the center of gravity for the at least one of the plurality of waypoints exceeding the predefined threshold, determining at least one weight to move a distance to result in a change of the center of gravity to a value below the predefined threshold and generating a second user interface for display on the display that provides a selection based on the determining of the at least one weight; and updating the generated first user interface based on a receipt of the selection.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any suitable vehicle, such as rotorcraft, automobiles, marine vessels, etc., and that the following description regarding an aircraft is merely one exemplary embodiment for managing a center of gravity on a display associated with a vehicle of the present disclosure. It should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the display system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
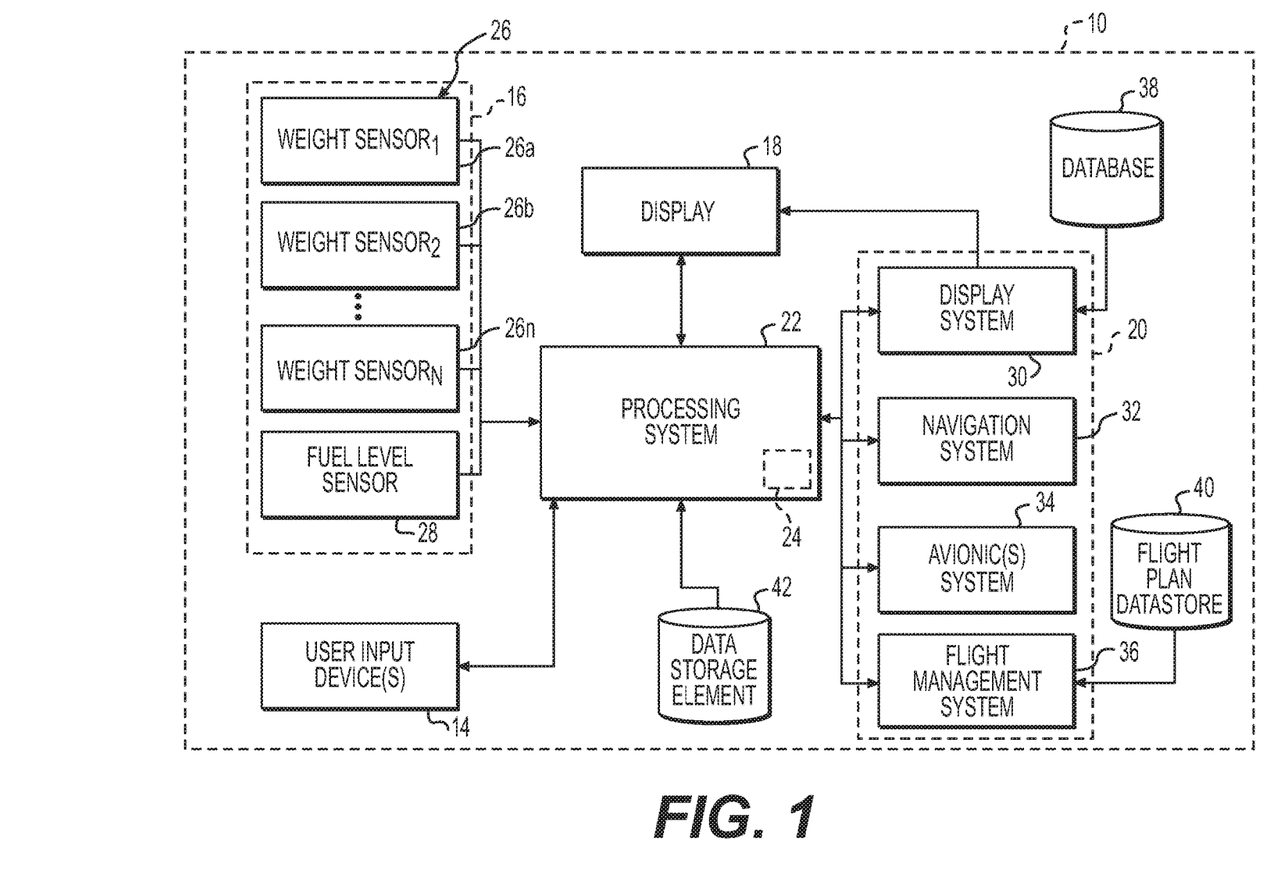
FIG. 1 is a functional block diagram illustrating a vehicle, such as an aircraft, that includes a center of gravity system for managing a center of gravity on a display associated with the vehicle in accordance with various embodiments.

With reference to FIG. 1, a vehicle, such as an aircraft 10, is shown. In one example, the aircraft 10 comprises a fixed-wing aircraft; however, the aircraft 10 can comprise any vehicle, such as a rotorcraft, etc. In this example, the aircraft 10 includes one or more user input devices 14, one or more sensors 16, a display 18 and one or more aircraft systems 20, which are each in communication with a processing system 22. As will be discussed herein, the processing system 22 includes a center of gravity module 24 embedded therein, which enables a user, such as a pilot and/or co-pilot, to view and manage a forward and aft center of gravity of the aircraft 10 on the display 18. Stated another way, the center of gravity module 24 generates a first user interface that provides a visual indicator to the pilot and/or copilot of the forward and aft center of gravity of the aircraft 10 at each waypoint of a flight plan for the aircraft 10 for rendering on the display 18. The center of gravity module 24 also generates a second user interface that provides a selection or receives manual input from the pilot and/or copilot that enables the pilot and/or copilot to manage the center of gravity of the aircraft 10 by moving a weight associated with the aircraft 10. By computing the forward and aft center of gravity of the aircraft 10 and displaying the forward and aft center of gravity on the display, the pilot's workload is reduced as the pilot may identify where the forward and/or aft center of gravity is outside of a predefined acceptable limit along the flight plan and/or may identify where the forward and/or aft center of gravity is within the predefined acceptable limit along the flight plan. In addition, by displaying the second user interface that enables the selection or receives manual input to manage the forward and aft center of gravity, the pilot may manage the forward and/or aft center of gravity to bring the forward and/or aft center of gravity within the predefined acceptable limit prior to the forward and/or aft center of gravity actually exceeding the predefined acceptable limit. This also reduces pilot workload and ensures smooth operation of the aircraft 10. Although the figures shown herein depict an example with certain arrangements of elements, additional intervening elements, devices, features, or components may be present in an actual embodiment. It should also be understood that FIG. 1 is merely illustrative and may not be drawn to scale.

The one or more user input devices 14 enable a user (e.g, the pilot, copilot or other crew member) to interact with the aircraft 10, including the display 18 and the processing system 22. The user input device 14 may be implemented as a keyboard (not separately shown), a microphone (not separately shown), a touchscreen layer associated with the display 18, a touch pen, a number pad, a mouse, a touchpad, a roller ball, a pushbutton, a switch, a joystick, a knob, a digital notepad or other suitable device to receive data and/or commands from the user. Of course, multiple input devices 14 may also be utilized. The input received from the user input device 14 is communicated to the processing system 22 over a suitable communication architecture that facilitates the transfer of data, power, commands, etc., such as a bus associated with the aircraft 10.

The one or more sensors 16 are associated with the aircraft 10 to observe various conditions of the aircraft 10 and generate sensor signals based thereon. In one example, the one or more sensors 16 include at least one weight sensor 26 and at least one fuel level sensor 28. In certain embodiments, the at least one weight sensor 26 is a plurality of weight sensors 26a-n, which are each associated with a respective one of a plurality of landing wheels of the aircraft 10. Thus, for example, each of the plurality of weight sensors 26a-n is a landing gear weight on wheel sensor. In this example, the aircraft 10 includes at least a forward or nose weight sensor 26a, a first aft weight sensor 26b and a second aft weight sensor 26n. The nose weight sensor 26a observes a weight on a nose landing gear of the aircraft 10, and generates sensor signals based thereon. The first aft weight sensor 26b observes a weight on a landing gear associated with a first, right wing of the aircraft 10 and generates sensor signals based thereon. The second aft weight sensor 26n observes a weight on a landing gear associated with a second, left wing of the aircraft 10 and generates sensor signals based thereon. Each of the sensor signals from the plurality of weight sensors 26a-n are communicated to the processing system 22 over a suitable communication architecture that facilitates the transfer of data, power, commands, etc., such as a bus associated with the aircraft 10.

The at least one fuel level sensor 28 observes at least one fuel tank associated with the aircraft 10 and generates sensor signals based thereon. In one example, each fuel tank of the aircraft 10 includes a fuel level sensor 28, which generates sensor signals based on an amount of fuel in the fuel tank. These sensor signals from the at least one fuel level sensor 28 are communicated to the processing system 22 over a suitable communication architecture that facilitates the transfer of data, power, commands, etc., such as a bus associated with the aircraft 10.

In this example, the display 18 is associated with and is onboard the aircraft 10. The display 18 is in communication with the center of gravity module 24 of the processing system 22 to display one or more user interfaces to inform the pilot and/or copilot of the forward and aft center of gravity at each waypoint along a flight plan associated with the aircraft 10 and to enable receipt of input from the pilot and/or copilot to manage the forward and aft center of gravity, as will be discussed in greater detail herein. While a single display 18 is illustrated in FIG. 1, it will be understood that the display 18 can include any number of displays that are viewable by occupants of the aircraft 10, including the pilot and/or copilot. The display 18 comprises any suitable technology for displaying information, including, but not limited to, a liquid crystal display (LCD), organic light emitting diode (OLED), plasma, or a cathode ray tube (CRT). In this example, the display 18 is an electronic display capable of graphically displaying a first user interface superimposed over flight information or other data associated with the operation of the aircraft 10 and a second user interface superimposed over flight information or other data associated with the operation of the aircraft 10 under the control of the processing system 22 and a display system 30 of the aircraft systems 20. In this regard, the display 18 is coupled to the processing system 22 and the display system 30, and the processing system 22 and the display system 30 cooperate to display, render and otherwise convey one or more graphical and/or textual representations or images associated with the operation of the aircraft 10, along with the one or more user interfaces superimposed over a respective one of the one or more graphical and/or textual representations or images associated with the operation of the aircraft 10.

In one example, the one or more aircraft systems 20 include the display system 30, a navigation system 32, an avionics system 34 and a flight management system 36. The display system 30 generally represents the hardware, firmware, processing logic and/or other components configured to control the display and/or rendering of one or more displays pertaining to operation of the aircraft 10 and/or systems 32, 34, 36 on the display 18 (e.g., synthetic vision displays, navigational maps, and the like). In this regard, the display system 30 may access or include one or more databases 38 suitably configured to support operations of the display system 30, such as, for example, a terrain database, an obstacle database, a navigational database, a geopolitical database, a terminal airspace database, a special use airspace database, or other information for rendering and/or displaying navigational maps and/or other content on the display 18. In this regard, in addition to including a graphical representation of terrain, a navigational map displayed on the display 18 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. As will be discussed below, the processing system 22 generates first user interface data and second user interface data, and the processing system 22 outputs the generated first user interface data and the second user interface data for the display 18 to be superimposed on the navigational maps and/or other content rendered on the display 18. The display system 30 is in communication with the processing system 22 and the display 18 over a suitable communication architecture that facilitates the transfer of data, commands, power, such as a bus, associated with the aircraft 10.

The flight management system 36 is communicatively coupled to the navigation system 32, the avionics system 34 and the processing system 22 to support navigation, flight planning, and other aircraft control functions in a conventional manner, as well as to provide real-time data and/or information regarding the operational status of the aircraft 10 to the processing system 22. Briefly, the navigation system 32 provides substantially real-time navigational data regarding the operation of the aircraft 10. In this example, the navigation system 32 includes at least a global positioning system (GPS), which provides a current global position of the aircraft 10. The navigation system 32 may also include one or more position sensors, such as radio aids, scanning distance measuring equipment, VHF omnidirectional radio range (VORs) or long range aid to navigation (LORAN), inertial reference systems (IRS). The navigation system 32 may integrate the positions obtained from the one or more position sensors and determine a single position of the aircraft 10 (e.g. latitude, longitude, altitude, heading) and a corresponding accuracy of the position.

The avionics system 34 obtains and provides real-time flight related information to the processing system 22, which can be displayed on the display 18 by the display system 30 and/or otherwise communicated to the pilot, co-pilot and/or a crew member. Generally, the avionics system 34 may include multiple avionics systems, such as a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Thus, the avionics system 34 support navigation, flight planning and control functions of the aircraft 10 in a conventional manner.

The flight management system 36 manages a flight plan associated with the aircraft 10 while in-flight. In one example, the flight management system 36 receives the flight plan data from a communications system associated with the aircraft 10 and stores the flight plan data in a flight plan datastore 40 onboard the aircraft 10. Generally, the flight plan data comprises the planned or target flight path for the aircraft 10, from take-off to landing, which can include a selected flight plan for take-off, a selected flight plan for level or cruising flight, a selected flight plan for approach to landing, and so on. For each of the selected flight plans, the selected flight plan can be broken down into segments or legs. In one example, the selected flight plan for the aircraft 10 can have two or more legs, separated by one or more waypoints, which define the flight path.

In addition, the flight management system 36 determines a fuel consumption for the aircraft 10 over the flight plan based on distance data associated with the flight path and a predefined or factory-set value for fuel economy of the aircraft 10. Generally, the flight management system 36 determines the fuel consumed between each waypoint of the flight plan. The flight management system 36 is in communication with the processing system 22 over a suitable communication architecture that facilitates the transfer of data, power, commands, etc., such as a bus associated with the aircraft 10.

The flight plan datastore 40 stores the information required for managing the flight plan, as is known in the art. The flight plan datastore 40 can be defined in the ARINC 424 standard. The flight plan datastore 40 stores, for example, waypoints/intersections, airways, radio navigations aids, airports, runways, standard instrument departure data, standard terminal arrival data, holding patterns and instrument approach procedures. The flight plan datastore 40 also stores the defined legs of each of the flight plans, along with distance data in nautical miles for the flight plan. The flight plan datastore 40 can also store one or more vertical profiles associated with each of the defined legs of each of the flight plans. Generally, the vertical profile comprises an altitude range, speed, flight path angle, etc. for the aircraft 10 for the particular leg of the flight plan.

The processing system 22 generally represents the hardware, circuitry, processing logic, and/or other components configured to facilitate communications and/or interaction between the elements of the aircraft 10 and perform additional processes, tasks and/or functions to support operation of the aircraft 10, as described in greater detail below. Depending on the embodiment, the processing system 22 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 22 includes processing logic that may be configured to carry out the functions, techniques, and processing tasks associated with the operation of the aircraft 10 described in greater detail below. Furthermore, the steps of a method or algorithm described in connection with the embodiments disclosed herein may be embodied directly in hardware, in firmware, in a software module executed by the processing system 22, or in any practical combination thereof. In accordance with one or more embodiments, the processing system 22 includes or otherwise accesses a data storage element 42, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 22, cause the processing system 22 to execute and perform one or more of the processes, tasks, operations, and/or functions described herein.

The center of gravity module 24 is embedded within the processing system 22. The center of gravity module 24 receives as input weight data from the plurality of weight sensors 26a-n, fuel data from the at least one fuel level sensor 28, fuel consumption data and flight plan data from the flight management system 36 and navigation data from the navigation system 32 and generates a first user interface that is output to the display 18 based on the systems and methods of the present disclosure. The center of gravity module 24 receives as input the weight data from the plurality of weight sensors 26a-n, the fuel data from the at least one fuel level sensor 28, the fuel consumption data and the flight plan data from the flight management system 36, and the navigation data from the navigation system 32 and generates a second user interface that is output to the display 18 based on the systems and methods of the present disclosure. The center of gravity module 24 also receives input data and generates the first user interface based on the input data, the navigation data and the flight plan data, along with the systems and methods of the present disclosure.

Figure 2:
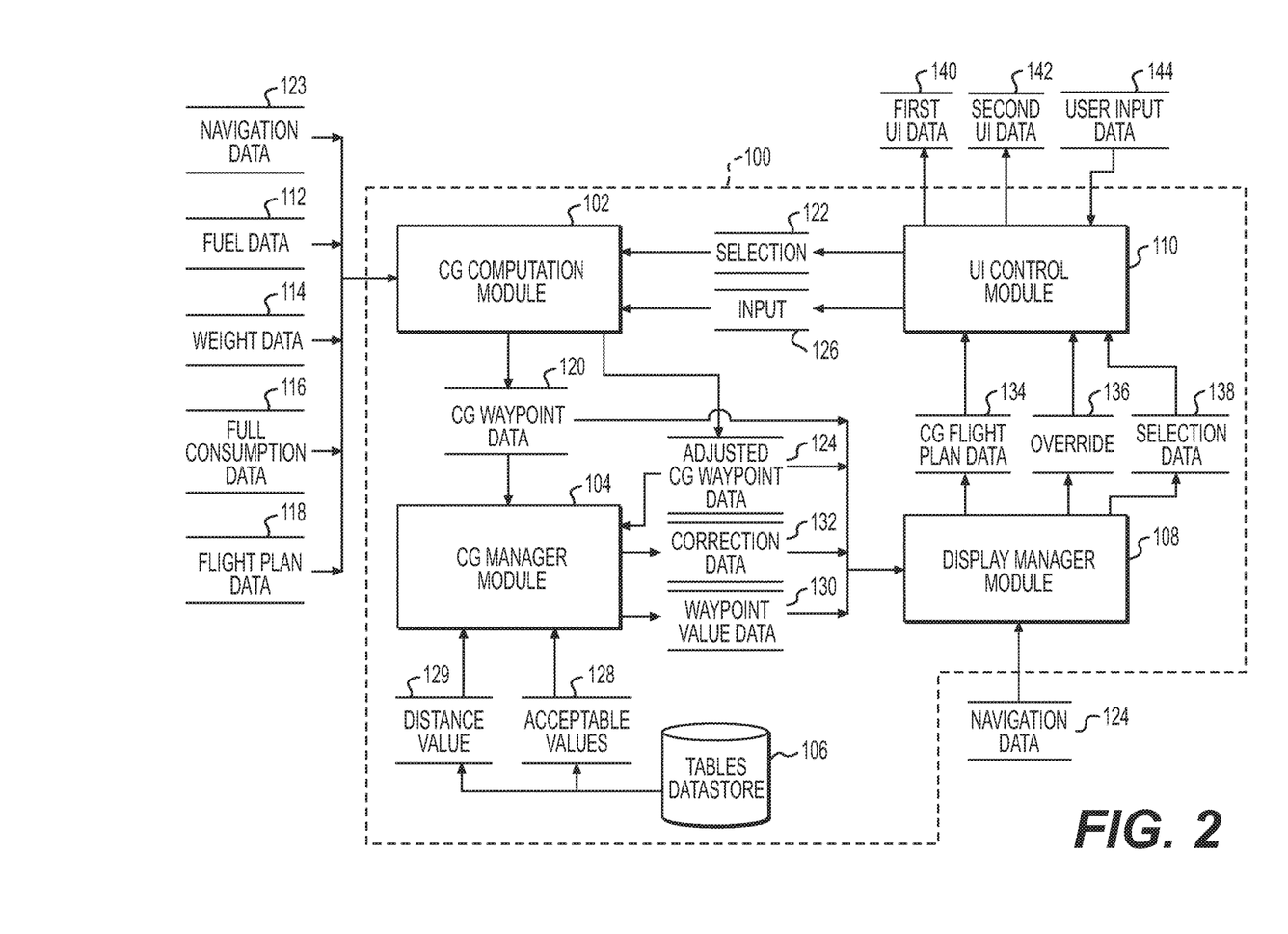
FIG. 2 is a dataflow diagram illustrating a system of the center of gravity system of FIG. 1 in accordance with various embodiments.

Referring now to FIG. 2, and with continued reference to FIG. 1, a dataflow diagram illustrates various embodiments of a system 100 for the aircraft 10 for the managing of a center of gravity of the aircraft on a display associated with the aircraft, which may be embedded in the center of gravity module 24 of the processing system 22. Various embodiments of the control system 100 according to the present disclosure can include any number of sub-modules embedded within the center of gravity module 24. As can be appreciated, the sub-modules shown in FIG. 2 may be combined and/or further partitioned to similarly manage a center of gravity of the aircraft 10 on a display associated with the aircraft 10. Inputs to the control system 100 may be received from one or more of the user input devices 14 (FIG. 1), received from the one or more sensors 16 (FIG. 1), received from the flight management system 36 (FIG. 1), received from the navigation system 32 (FIG. 1), received from other control modules (not shown), and/or determined/modeled by other sub-modules (not shown) within the center of gravity module 24. In various embodiments, the center of gravity module 24 includes a center of gravity (CG) computation module 102, a CG manager module 104, a tables datastore 106, a display manager module 108 and a user interface (UI) control module 110.

The CG computation module 102 receives as input fuel data 112 from the fuel level sensor 28. The fuel data 112 is the sensor signals or sensor data generated by the fuel level sensor 28. The CG computation module 102 processes the fuel data 112, and determines a current amount of fuel in the one or more fuel tanks associated with the aircraft 10. Generally, the CG computation module 102 retrieves the fuel data 112 prior to the start of the flight path or journey such that the current amount of fuel is an initial amount of fuel onboard the aircraft 10 prior to take-off.

The CG computation module 102 also receives as input weight data 114 from the one or more weight sensors 26, such as the weight sensors 26a, 26b, 26n. The weight data 114 are the sensor signals or sensor data generated by the weight sensors 26a-n when the aircraft 10 is on the ground, typically prior to the start of the flight path or journey (i.e. prior to take-off). The CG computation module 102 processes the weight data 114, and determines an initial weight of the aircraft 10. Based on the initial weight of the aircraft 10, the CG computation module 102 calculates the initial forward and aft center of gravity of the aircraft 10. In one example, the CG computation module 102 calculates the initial forward center of gravity of the aircraft 10 based on the following equation:

$$C.G. \ (\% \ MAC) = \frac{\frac{Total \ Moment}{Total \ G.W.} - n}{k} \quad (1)$$

Wherein "C.G." is the center of gravity in percent of the mean aerodynamic cord (MAC); "Total Moment" is determined using one of equations (2) or (3), below; "Total G.W." is the gross weight of the aircraft 10, which is calculated as discussed below with regard to equations (2), (3) and (4); n is a predefined constant value for the mean aerodynamic cord position in relative to an aircraft axis origin in meters that is associated with a particular model of aircraft 10 and retrieved from a memory associated with the CG computation module 102 or the data storage element 42; and k is a predefined constant value for the length of the mean aerodynamic cord (MAC) in meters that is associated with a particular type of aircraft 10 and retrieved from a memory associated with the CG computation module 102 or the data storage element 42. In the example of a Boeing 747-400 as the aircraft 10, n is about 1258 and k is about 3.278.

For the aircraft 10 comprising an aircraft with the weight sensor 26 associated with each of the wheels, in the example of the aircraft 10 having 18 wheels, the "Total Moment" is:

$$\begin{aligned}Total \ Moment = & \quad (2)\\ & ((Wheel \ Wgt1 + WheelWgt2 + WheelWgt3 + WheelWgt4) \times k_2) +\\ & ((Wheel \ Wgt3 + WheelWgt4 + WheelWgt5 + WheelWgt6) \times k_3) +\\ & ((Wheel \ Wgt5 + WheelWgt6 + WheelWgt9 + WheelWgt10) \times k_4) +\\ & ((Wheel \ Wgt7 + WheelWgt8 + WheelWgt11 + WheelWgt12) \times k_5) +\\ & ((Wheel \ Wgt17 + WheelWgt8) \times k_6)\end{aligned}$$

Wherein "Wheel Wgt1-Wheel Wgt18" are the sensor signals or sensor data from a respective one of the weight sensors 26a-26n, and in this example, are the sensor signals or sensor data from 18 of the weight sensors 26, which are each coupled to respective one of the 18 wheels; $k_1$, $k_2$, $k_3$, $k_4$, $k_5$ and $k_6$ are each constants, which are predefined values associated with the aircraft 10, which may be retrieved from a memory associated with the CG computation module 102 or the data storage element 42. In this example of the aircraft 10 having the weight sensors 26a-26n, the "Total G.W." is the gross weight of the aircraft 10, which is a summation of each of the sensor signals from the weight sensors 26a-n, or the sum of each of the WheelWgt1-WheelWgt18, e.g. WheelWgt1+WheelWgt2+WheelWgt3 WheelWgt18.

In certain embodiments, the "Total Moment" may be calculated without the weight data 114. In these embodiments, the "Total Moment" is:

$$Total \ Moment = (Zero \ Fuel \ Wgt \ C.G. - k_6) \times k_7 \times Zero \ Fuel \ Wgt \quad (3)$$

Wherein the "Zero Fuel Wgt C.G." is a predefined value associated with the aircraft 10 having a zero fuel weight, which is retrieved from a memory associated with the CG computation module 102 or the data storage element 42; $k_6$ and $k_7$ are constants, that are predefined values associated with the aircraft 10, which may be retrieved from a memory associated with the CG computation module 102 or the data storage element 42; and "Zero Fuel Wgt" is the weight of the aircraft with zero fuel weight or no fuel onboard. In this embodiment, the "Total G.W." is the sum of all landing gear weights, which is a predefined value associated with the aircraft 10 and retrieved from the data storage element 42; or the "Total G.W." may be calculated without the gear weights based on input received from the user input devices 14. In this example, the "Total G.W." is:

$$Total \ G.W. = Zero \ Fuel \ Wgt + Fuel \ Wgt + Passenger \ Wgt + Cargo \ Wgt \quad (4)$$

Wherein "Zero Fuel Wgt" is the weight of the aircraft with zero fuel weight or no fuel onboard, which is a predefined value associated with the aircraft 10 that is retrieved from a memory associated with the CG computation module 102 or the data storage element 42; "Fuel Wgt" is the weight of the fuel onboard the aircraft; "Passenger Wgt" is received as input from the user input devices 14; and "Cargo Wgt" is received as input from the user input devices 14.

In one example, the CG computation module 102 calculates the initial aft center of gravity of the aircraft 10 based on equation (1), and in this example, equation (2). Generally, while the aircraft 10 may have a forward center of gravity limit that is less than an aft center of gravity limit, the initial center of gravity, both forward and aft, is calculated using equation (1) and (2). As the aircraft 10 proceeds along the flight path, the fuel consumed changes the fuel weight, which in turn, changes the "Total Moment", which may result in the different values for the forward center of gravity and the aft center of gravity of the aircraft 10.

The CG computation module 102 receives as input fuel consumption data 116 and journey or flight plan data 118. In one example, the fuel consumption data 116 and the flight plan data 118 are each received from the flight management system 36. The flight plan data 118 indicates the waypoints along the flight path, and the fuel consumption data 116 indicates an amount of fuel consumed between each waypoint in the flight plan data 118.

Based on the determined initial amount of fuel onboard the aircraft 10, and the fuel consumption data 116, the CG computation module 102 subtracts the fuel consumed at each waypoint along the flight plan (based on the fuel consumption data 116 and the flight plan data 118) to determine a change in the weight of the aircraft 10 at each waypoint along the flight plan. Stated another way, as the fuel in the fuel tanks onboard the aircraft 10 have a known weight per unit volume and a known location, the CG computation module 102 determines the volume of fuel remaining at each waypoint and subtracts from the initial determined weight of the aircraft 10 the weight associated with the amount of fuel consumed. Thus, for each waypoint along the flight plan, based on the initial determined weight of the aircraft 10, the fuel consumption data 116, the flight plan data 118 and the initial amount of fuel onboard the aircraft 10, the CG computation module 102 calculates the weight of the aircraft 10 at each waypoint along the flight plan. For each weight calculated, the CG computation module 102 determines the forward and aft center of gravity associated with the weight of the aircraft 10 at the particular waypoint using equation (1); and in this example, equation (2), above. The CG computation module 102 sets the forward and aft center of gravity calculated for each waypoint as CG waypoint data 120 for the CG manager module 104 and the display manager module 108.

The CG computation module 102 also receives as input a selection 122. The selection 122 is received from the UI control module 110 and, as will be discussed herein, is a user selection to change the forward and/or aft center of gravity of the aircraft 10 by moving a predetermined weight associated with the aircraft 10 a predetermined distance. Based on the receipt of the selection 122, the CG computation module 102 receives as input navigation data 123. The navigation data 123 is a current geographical position of the aircraft 10, as received from the navigation system 32. Based on the current position of the aircraft 10, the CG computation module 102 determines which of the waypoints in the flight plan data 118 are downstream or down path from the current position. The CG computation module 102 may also determine whether the aircraft 10 has reached the end of the flight plan based on the navigation data 123 and the flight plan data 118. For each waypoint down path of the current position, the CG computation module 102 recalculates the forward and aft center of gravity at each remaining waypoint based on the movement of the weight identified in the selection 122 and the weight of the aircraft 10 at each waypoint along the flight plan, which was previously calculated based on the initial determined weight of the aircraft 10, the fuel consumption data 116 and the fuel data 112. Stated another way, the CG computation module 102 calculates an adjusted forward and aft center of gravity of the aircraft 10 by modifying the previously calculated weight of the aircraft 10 by the amount of weight moved in the selection 122 and recalculating the forward and aft center of gravity at each waypoint based on the new weight calculated for each waypoint using equation (1); and in this example, equation (2), above. The CG computation module 102 sets the recomputed forward and aft center of gravity for each waypoint as adjusted CG waypoint data 124 for the CG manager module 104 and the display manager module 108.

The CG computation module 102 also receives input 126. The input 126 is received from the UI control module 110 and, as will be discussed herein, is a user inputted change to the forward and/or aft center of gravity of the aircraft 10. Generally, the input 126 is a user inputted amount of weight to move a user inputted amount of distance. Based on the receipt of the input 126, the CG computation module 102 receives as input the navigation data 123. Based on the current position of the aircraft 10, the CG computation module 102 determines which of the waypoints in the flight plan data 118 are downstream or down path from the current position. For each waypoint down path of the current position, the CG computation module 102 recalculates the forward and aft center of gravity at each remaining waypoint based on the input 126 and the weight of the aircraft 10 at each waypoint along the flight plan, which was previously calculated based on the initial determined weight of the aircraft 10, the fuel consumption data 116 and the fuel data 112. Stated another way, the CG computation module 102 calculates an adjusted forward and aft center of gravity of the aircraft 10 by modifying the previously calculated weight of the aircraft 10 by the amount of weight moved in the input 126 and recalculating the forward and aft center of gravity at each waypoint based on the new weight calculated for each waypoint using equation (1); and in this example, equation (2), above. The CG computation module 102 sets the recomputed forward and aft center of gravity for each waypoint as the adjusted CG waypoint data 124 for the CG manager module 104 and the display manager module 108.

The tables datastore 106 stores one or more look-up tables (e.g., lookup tables) that provide a predefined acceptable threshold for the forward and aft center of gravity of the aircraft 10. In other words, the tables datastore 106 stores one or more tables that provide a predefined threshold or acceptable value for the forward and aft center of gravity of the aircraft 10. In one example, the tables are populated based on calibration data, which is factory-set by the manufacturer of the aircraft 10. Acceptable values 128 provided by the tables datastore 106 provides a predefined threshold for the forward and aft center of gravity or a predefined acceptable limit for the forward and aft center of gravity of the aircraft 10. For example, the predefined acceptable limit for the forward center of gravity of a Boeing 747-400 is about 11% MAC and the predefined acceptable limit for the aft center of gravity of the Boeing 747-400 is about 34% MAC.

The tables datastore 106 also stores one or more look-up tables (e.g., lookup tables) that provide a predefined distance a weight may be moved for a particular aircraft. In other words, the tables datastore 106 stores one or more tables that provide a predefined value for the distance to move weight on the aircraft 10. In one example, the tables are populated based on calibration data, which is factory-set by the manufacturer of the aircraft 10. A distance value 129 provided by the tables datastore 106 provides a predefined distance for moving a weight on the aircraft 10. The tables in the tables datastore 106 may be indexed by aircraft model, aircraft manufacturer, etc. to provide the distance value 129. Generally, the particular type (e.g. make, model) of aircraft 10 is stored in a memory associated with the CG manager module 104 or may be received from other modules associated with the aircraft 10.

The CG manager module 104 receives as input the CG waypoint data 120. Based on the CG waypoint data 120, the CG manager module 104 queries the tables datastore 106 for the acceptable values 128 associated with the forward and aft center of gravity. The CG manager module 104 compares the acceptable values 128 to the forward and aft center of gravities in the CG waypoint data 120 for each waypoint. Based on the comparison, the CG manager module 104 sets waypoint value data 130 for the display manager module 108. The waypoint value data 130 indicates whether a forward or aft center of gravity at a particular waypoint is outside of (i.e. above) the predefined threshold for the forward or aft center of gravity of the aircraft 10, is within the predefined threshold for the forward or aft center of gravity of the aircraft 10 or is near the predefined threshold for the forward or aft center of gravity of the aircraft 10 (e.g. within one percent of the predefined threshold), based on the acceptable values 128 retrieved from the tables datastore 106.

Based on the comparison of the acceptable values 128 to the CG waypoint data 120, the CG manager module 104 also determines correction data 132. The correction data 132 is an amount of weight to move a distance to cause the forward and/or aft center of gravity to fall below the predefined threshold. Stated another way, the correction data 132 is one or more changes to the weight of the aircraft 10 that will place the forward and/or aft center of gravity within the acceptable limit. In one example, the CG manager module 104 determines the correction data 132 for each waypoint identified in which the forward and/or aft center of gravities is beyond the predefined threshold of the acceptable values 128. The CG manager module 104 retrieves the distance value 129 from the tables datastore 106 based on a known type of the aircraft 10, which is retrieved from a memory associated with the CG manager module 104 or the data storage element 42, and calculates the correction data 132 based on the following equation:

$$\frac{\text{Weight Shifted}}{\text{Total Weight}} = \frac{\text{Delta } C.G.}{\text{Distance Weight Shifted}} \quad (5)$$

Wherein "Total Weight" is the sum of the sensor signals from the weight sensors 26*a-n*; "Delta C.G." is the change in the center of gravity needed to place the forward and/or aft center of gravity within the acceptable limit; "Distance Weight Shifted" is the distance value 129 retrieved from the tables datastore 106; and "Weight Shifted" is the amount of weight required to be moved to cause the forward and/or aft center of gravity to fall below the predefined threshold. The CG manager module 104 sets the correction data 132 as the calculated "Weight Shifted," the distance value 129 and the "Delta C.G." for the display manager module 108.

The CG manager module 104 also receives as input the adjusted CG waypoint data 124. Based on the adjusted CG waypoint data 124, the CG manager module 104 queries the tables datastore 106 for the acceptable values 128 associated with the forward and aft center of gravity. The CG manager module 104 compares the acceptable values 128 to the forward and aft center of gravities in the adjusted CG waypoint data 124 for each waypoint. Based on the comparison, the CG manager module 104 sets the waypoint value data 130 for the display manager module 108. Based on the comparison of the acceptable values 128 to the adjusted CG waypoint data 124, the CG manager module 104 also determines the correction data 132 associated with the adjusted CG waypoint data 124. In one example, the CG manager module 104 determines the correction data 132 for each waypoint identified in which the forward and/or aft center of gravities in the adjusted CG waypoint data 124 is beyond the predefined threshold of the acceptable values 128. The CG manager module 104 sets the correction data 132 for the display manager module 108.

The display manager module 108 receives as input the CG waypoint data 120 and the waypoint value data 130. Based on the CG waypoint data 120 and the waypoint value data 130, the display manager module 108 associates the waypoint value from the waypoint value data 130 (within the predefined threshold, near the predefined threshold or exceeds the predefined threshold) with each of the forward and aft center of gravities for a particular waypoint from the CG waypoint data 120 and generates CG flight plan data 134 based on this association. The CG flight plan data 134 is the waypoint value for the forward and aft center of gravity of each waypoint along the flight plan. The display manager module 108 sets the CG flight plan data 134 for the UI control module 110.

The display manager module 108 also receives as input the adjusted CG waypoint data 124. Based on the adjusted CG waypoint data 124, the display manager module 108 associates the waypoint value data 130 with each of the adjusted forward and aft center of gravities for the down path waypoints and generates updated CG flight plan data 134 for the UI control module 110 based on this association.

Based on the waypoint value data 130, the display manager module 108 also receives as input the navigation data 123 and the correction data 132. The display manager module 108 processes the navigation data 123 to determine which waypoint the aircraft 10 is approaching. The display manager module 108 also determines whether the current position of the aircraft 10 is within about three or less waypoints from a waypoint that was identified to have a center of gravity that exceeds the predefined threshold in the waypoint value data 130. The display manager module 108 processes the correction data 132 to determine one or more selections for the waypoint the aircraft 10 is approaching that has the center of gravity that currently exceeds the predefined threshold. When the current position of the aircraft 10 is determined to be within about three or less waypoints from a waypoint, the display manager module 108 sets an override 136 for the UI control module 110 and sets the selection data 138 for the UI control module 110. The override 136 is a command to display the second user interface over the first user interface to notify the pilot and/or copilot to adjust the forward and/or aft center of gravity of the aircraft 10. The selection data 138 includes the one or more selections determined based on the correction data 132 and the navigation data 123 for the pilot and/or copilot to be output by the UI control module 110 for rendering on the display 18 in the second user interface. Stated another way, the selection data 138 includes the one or more selections for a particular one of the waypoints that has a forward and/or aft center of gravity that exceeds the predefined threshold to adjust the forward and/or aft center of gravity at that particular waypoint to a value below the predefined threshold based on the correction data 132. Thus, the selection data 138 comprises one or more options that the pilot and/or co-pilot may select on the second user interface with the user input devices 14 to adjust the forward and/or aft center of gravity at that particular waypoint to a value below the predefined threshold.

The UI control module 110 receives as input the CG flight plan data 134. The UI control module 110 processes the CG flight plan data 134 and outputs this data as the first user interface (UI) data 140 for the display 18. The first UI data 140 includes data for rendering the first user interface, which includes the forward and aft center of gravities for each waypoint along the flight path along with a graphic and/or textual indicator whether the forward and/or aft center of gravity for a particular waypoint is within or exceeds the predefined threshold. By rendering the forward and aft center of gravities for each waypoint along the flight plan on the display 18, the pilot and/or co-pilot may identify the changes in the forward and the aft center of gravity of the aircraft 10 along the flight plan.

Figure 3:
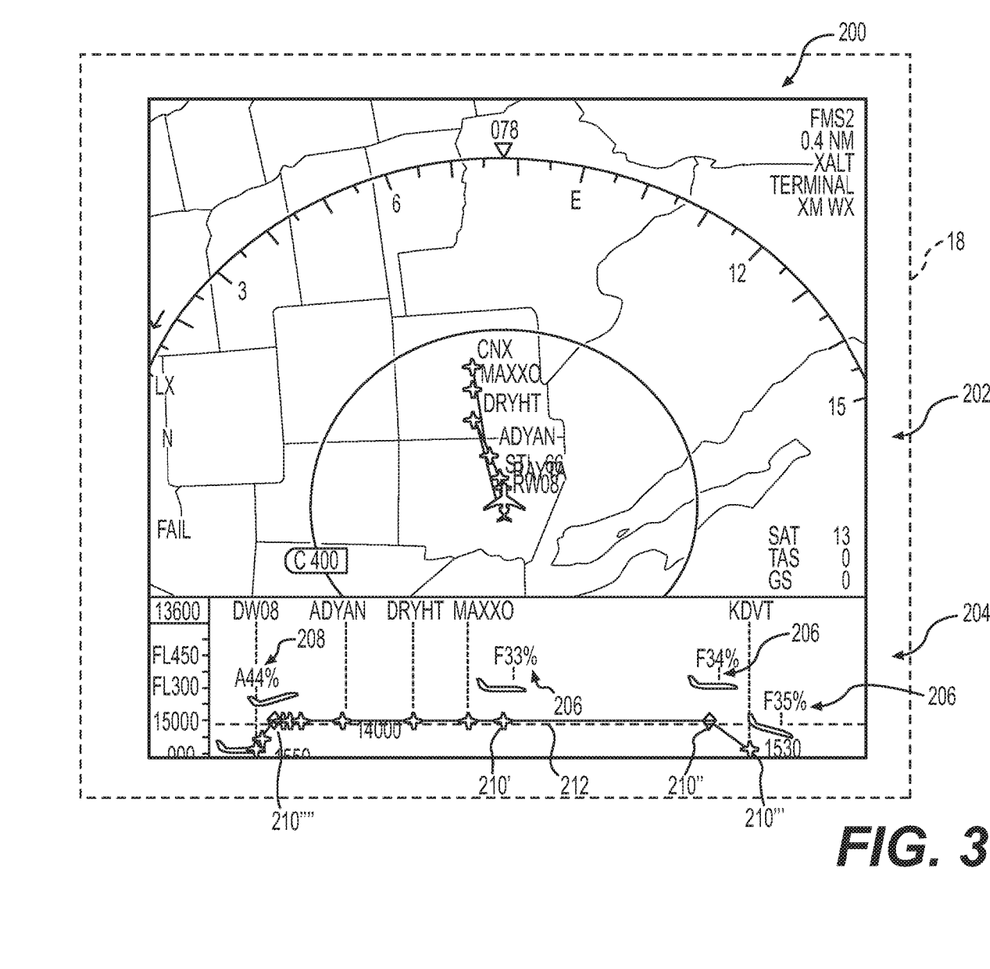
FIG. 3 is an illustration of one exemplary first user interface generated by the center of gravity system of FIG. 1, which displays a center of gravity of the aircraft at one or more waypoints along a flight plan of the aircraft to indicate a change in the forward and aft center of gravity of the aircraft over a flight plan of the aircraft.

With reference to FIG. 3, an exemplary first user interface 200 rendered on the display 18 based on the first UI data 140 of the center of gravity module 24 of the processing system 22 and the display system 30 is shown. In this example, the first user interface 200 includes an interactive navigational display 202 and a vertical situation display 204. The interactive navigational display 202 and the vertical situation display 204 are each generated or rendered by the display system 30 and/or processing system 22 based on the operating status of the aircraft 10, as received from the navigation system 32, the avionics system 34 and the flight management system 36. In one example, a forward center of gravity 206 and/or an aft center of gravity 208 for each waypoint 210 along a flight path 212 is illustrated on the vertical situation display 204. It should be noted that for ease of illustration the forward center of gravity 206 and the aft center of gravity 208 are not illustrated for each waypoint 210 in FIG. 3; however, the first user interface 200 may generally include the forward center of gravity 206 and the aft center of gravity 208 for each waypoint 210 on the flight path 212. In this example, the forward center of gravity 206 and the aft center of gravity 208 include a letter designation, such as F for forward and A for aft, and a numerical value, such as a percentage MAC that indicates the respective center of gravity value in percent of the mean aerodynamic cord for the particular waypoint 210.

In addition, the text and/or the numerical value is displayed in a color to indicate whether the respective forward center of gravity 206 and the aft center of gravity 208 exceeds the predefined threshold that is the acceptable limit for the forward and aft center of gravities. For example, the forward center of gravity 206 and the aft center of gravity 208 may be displayed in red if the value for the respective forward and aft center of gravities exceeds the predefined threshold, and may be displayed in another color, such as white or green, if the value for the respective forward and aft center of gravities is within the predefined threshold. The forward center of gravity 304 and the aft center of gravity 208 may be displayed in yellow if the value for the respective forward and aft center of gravities is near the predefined threshold, such as within one percent of the acceptable value. It should be noted that the use of a textual and numerical value to illustrate the forward and aft center of gravities for each waypoint along the flight path is merely exemplary, as any suitable graphical and/or textual indicator may be displayed to communicate this value along the flight path 212. Moreover, one or more icons may be displayed in different colors, such as red or green, to indicate that the respective forward and aft center of gravities for each waypoint along the flight path exceeds or is within the acceptable threshold. Thus, the first user interface 200 is merely an example.

As shown in FIG. 3, at waypoint 210' the forward center of gravity is 33%, which is within the predefined threshold for the acceptable limit of the forward center of gravity for the aircraft 10 and the forward center of gravity 206 is rendered in white. At waypoint 210", the forward center of gravity has changed to 34%, which is near the predefined threshold for the acceptable limit of the forward center of gravity for the aircraft 10 and the forward center of gravity 206 is rendered in yellow to indicate that the forward center of gravity at waypoint 210" is approaching the predefined threshold. At waypoint 210''', the forward center of gravity has changed to 35%, which exceeds the predefined threshold for the acceptable limit of the forward center of gravity for the aircraft 10. The forward center of gravity 206 is rendered in red at waypoint 210''' to indicate that the forward center of gravity will exceed the predefined threshold at this waypoint 210'''. The aft center of gravity 208 is rendered in yellow at waypoint 210'''' to indicate that the aft center of gravity at waypoint 210'''' is approaching the predefined threshold for the acceptable limit of the aft center of gravity for the aircraft 10. Thus, the first user interface 200 indicates the change in the forward and the aft center of gravity for the aircraft 10 from the waypoint 210' to the waypoint 210'''', and between waypoints on the flight plan, and also indicates that at least one of the waypoints 210 has a forward or an aft center of gravity that exceeds the predefined threshold.

Figure 4:
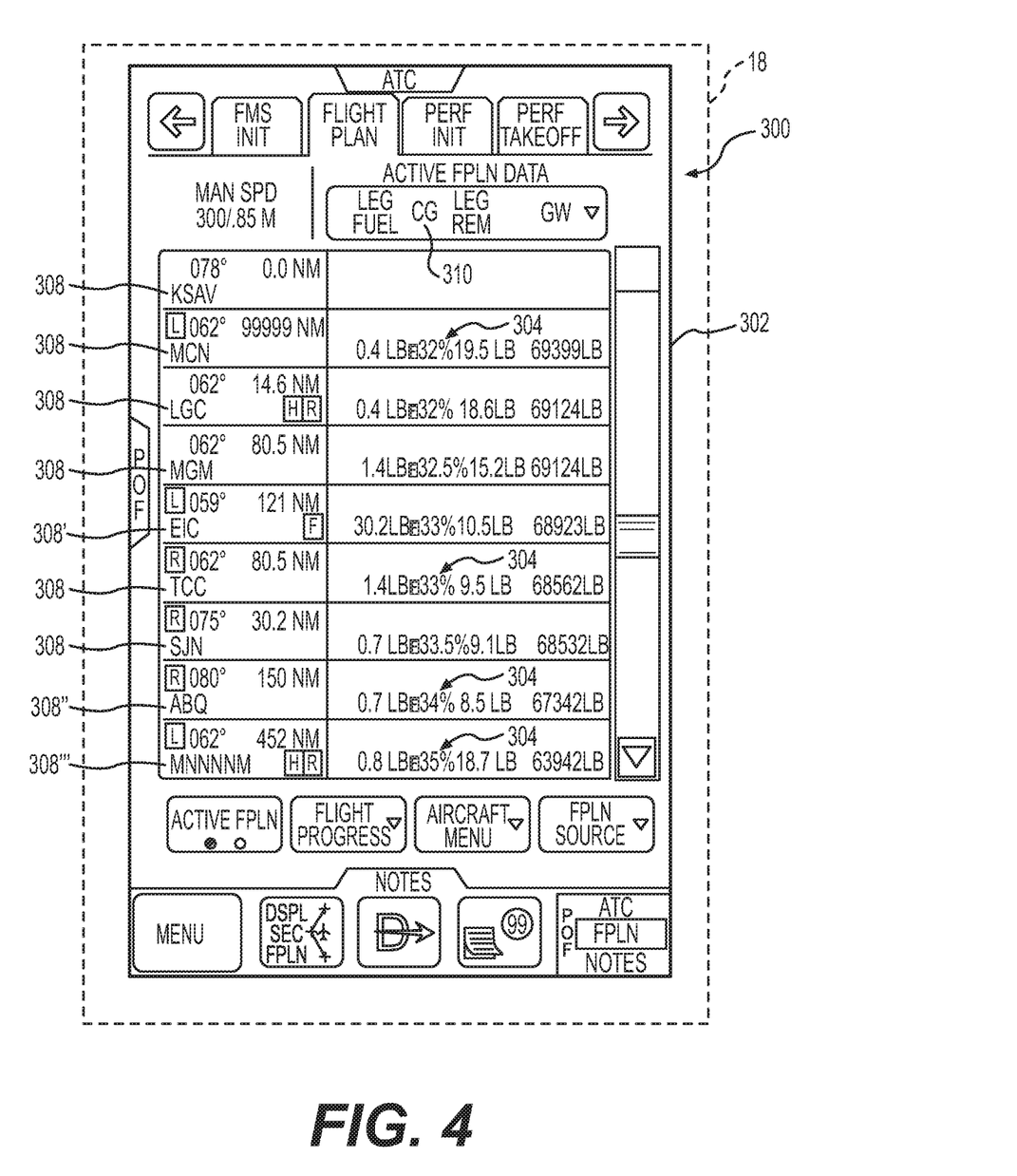
FIG. 4 is an illustration of another exemplary first user interface generated by the center of gravity system of FIG. 1, which displays a center of gravity of the aircraft at each waypoint along a flight plan of the aircraft to indicate a change in the forward and aft center of gravity of the aircraft over a flight plan of the aircraft.

With reference to FIG. 4, another exemplary first user interface 300 rendered on the display 18 based on the first UI data 140 of the center of gravity module 24 of the processing system 22 and the display system 30 is shown. In this example, the first user interface 300 includes a flight planning page display 302, which is generated or rendered by the display system 30 and/or processing system 22 based on the operating status of the aircraft 10, as received from the navigation system 32, the avionics system 34 and the flight management system 36. In one example, a forward center of gravity 304 and an aft center of gravity (not shown for ease of illustration) for each waypoint 308 along a flight path is illustrated on the flight planning page display 302. In one example, the flight planning page display 302 includes a column labeled "CG" 310, below which the CG values for each of the waypoints 308 are listed. In this example, the forward center of gravity 304 and the aft center of gravity include a letter designation, such as F for forward and A for aft, and a numerical value, such as a percentage MAC that indicates the respective center of gravity value in percent of the mean aerodynamic cord for the particular waypoint 308.

In addition, the text and/or the numerical value is displayed in a color to indicate whether the respective forward center of gravity 304 and the aft center of gravity exceeds the predefined threshold that is the acceptable limit for the forward and aft center of gravities. For example, the forward center of gravity 304 and the aft center of gravity may be displayed in red if the value for the respective forward and aft center of gravities exceeds the predefined threshold, and may be displayed in another color, such as white or green, if the value for the respective forward and aft center of gravities is within the predefined threshold. The forward center of gravity 304 and the aft center of gravity may be displayed in yellow if the value for the respective forward and aft center of gravities is near the predefined threshold, such as within one percent of the acceptable value. It should be noted that the use of a textual and numerical value to illustrate the forward and aft center of gravities for each waypoint 308 is merely exemplary, as any suitable graphical and/or textual indicator may be displayed to communicate this value at the waypoint 308.

As shown in FIG. 4, at waypoint 308' the forward center of gravity is 33%, which is within the predefined threshold for the acceptable limit of the forward center of gravity for the aircraft 10 and the forward center of gravity 206 is rendered in green. At waypoint 308", the forward center of gravity has changed to 34%, which is near the predefined threshold for the acceptable limit of the forward center of gravity for the aircraft 10 and the forward center of gravity 206 is rendered in yellow to indicate that the forward center of gravity at waypoint 308" is approaching the predefined threshold. At waypoint 308''', the forward center of gravity has changed to 35%, which exceeds the predefined threshold for the acceptable limit of the forward center of gravity for the aircraft 10. The forward center of gravity 206 is rendered in red at waypoint 308''' to indicate that the forward center of gravity will exceed the predefined threshold at this waypoint 308'''. Thus, the first user interface 300 indicates the change in the forward and the aft center of gravity for the aircraft 10 from the waypoint 308' to the waypoint 308''', and between each waypoint on the flight plan, and also indicates that at least one of the waypoints 308 has a forward or an aft center of gravity that exceeds the predefined threshold.

With reference back to FIG. 2, the UI control module 110 also receives as input the override 136 and the selection data 138. The UI control module 110 outputs second user interface (UI) data 142 for the display based on the receipt of the override 136. The second UI data 142 includes data for rendering a second user interface, which includes the one or more selections for the pilot and/or co-pilot based on the selection data 138. The second UI data 142 also includes one or more input boxes, such as text boxes, that receive manual input or the input 126 for the pilot and/or copilot to input a requested change to the forward and/or aft center of gravity for a particular waypoint. The second UI data 142 also includes the center of gravity for a particular waypoint, as determined from the CG flight plan data 134. The second UI data 142 also includes a change in the center of gravity, which is determined based on the CG flight plan data 134 received by the UI control module 110 after the receipt of user input data 144.

Figure 5:
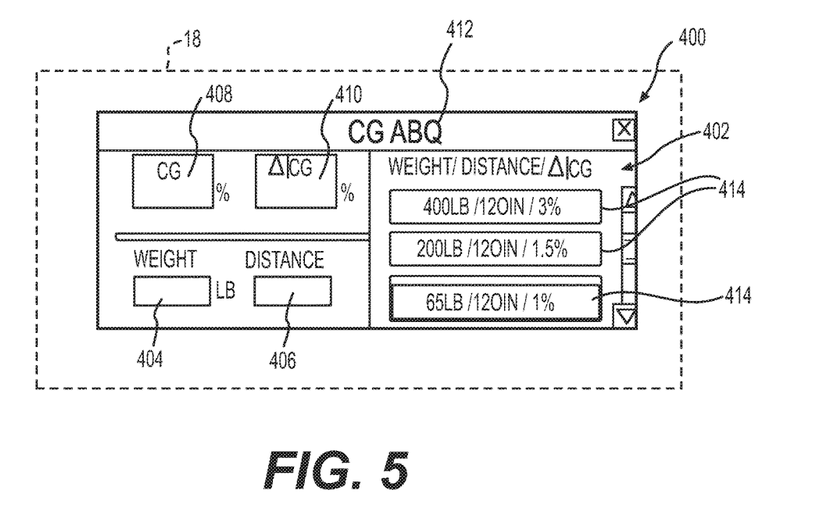
FIG. 5 is an illustration of one exemplary second user interface generated by the center of gravity system of FIG. 1, which displays at least one selection for the management of the center of gravity of the aircraft.

With reference to FIG. 5, an exemplary second user interface 400 rendered on the display 18 based on the second UI data 142 of the center of gravity module 24 of the processing system 22 and the display system 30 is shown. In one example, the second user interface 400 includes a selections list 402, a weight input box 404, a distance input box 406, a CG percentage indicator 408 and a change in CG indicator 410. In this example, the second user interface 400 is associated with a particular waypoint 412 (e.g. waypoint "ABQ"), such that for each waypoint along the flight plan, a second user interface 400 may be generated based on the forward and aft center of gravities of the aircraft 10.

The selections list 402 includes one or more selectable boxes 414, each of which corresponds to a particular selection received in the selection data 138. Each of the selectable boxes 414 includes a weight to move a distance to result in a change in the center of gravity for the aircraft 10. It should be noted that the selectable boxes 414 need not include the weight, the distance and the change in the center of gravity, but rather, the weight and the distance to move the weight may be displayed in a third user interface, such as a pop-up window, upon a selection of a particular change in the center of gravity.

The weight input box 404 enables the user to input, via the user input devices 14, one or more numerical values for a weight to move. The distance input box 406 enables the user to input, via the user input devices 14, one or more numerical values for a distance to move the weight inputted into the weight input box 404. The CG percentage indicator 408 indicates the current center of gravity at the waypoint 412, which is determined based on the CG flight plan data 134, and the change in CG indicator 410 indicates the change in the center of gravity at the waypoint 412, which is based on the CG flight plan data 134 received after the receipt of user input from the user input devices 14. In various embodiments, a numerical value displayed in the change in CG indicator 410 may be displayed in a color that indicates whether the change in the forward or aft center of gravity is to a value that is below the predefined threshold. For example, the numerical value may be displayed in white or green if the change in the forward or aft center of gravity is to a value that is below the predefined threshold; the numerical value may be displayed in yellow if the change in the forward or aft center of gravity is to a value that is near the predefined threshold (e.g. such as within one percent of the predefined threshold); and the numerical value may be displayed in red if the change in the forward or aft center of gravity is to a value that exceeds the predefined threshold.

With reference back to FIG. 2, the UI control module 110 also receives user input data 144. The user input data 144 is input received from one or more of the user input devices 14. The UI control module 110 processes the user input data 144 and determines whether the user input data 144 is the selection 122 of one or more selections displayed on the second user interface 400 rendered on the display 18 based on the second UI data 142. If true, the UI control module 110 sets the selection 122 for the CG computation module 102.

The UI control module 110 also processes the user input data 144 to determine whether the user input data 144 is manual input received through the one or more input boxes of the second user interface rendered based on the second UI data 142. If true, the UI control module 110 sets the input 126 for the CG computation module 102.

Figure 6:
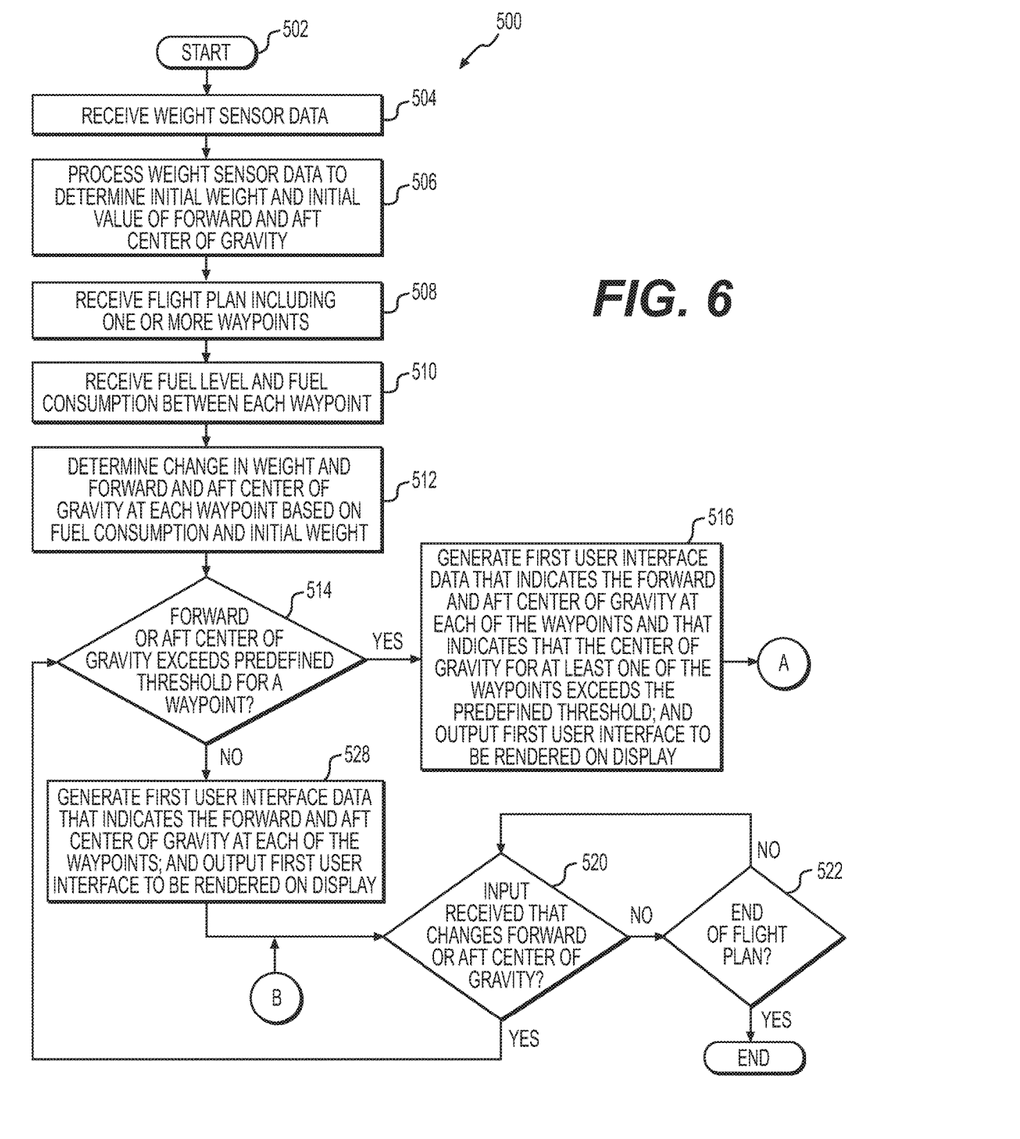
FIG. 6 is a flowchart illustrating a method of the center of gravity system of FIG. 1 in accordance with various embodiments.
Figure 7:
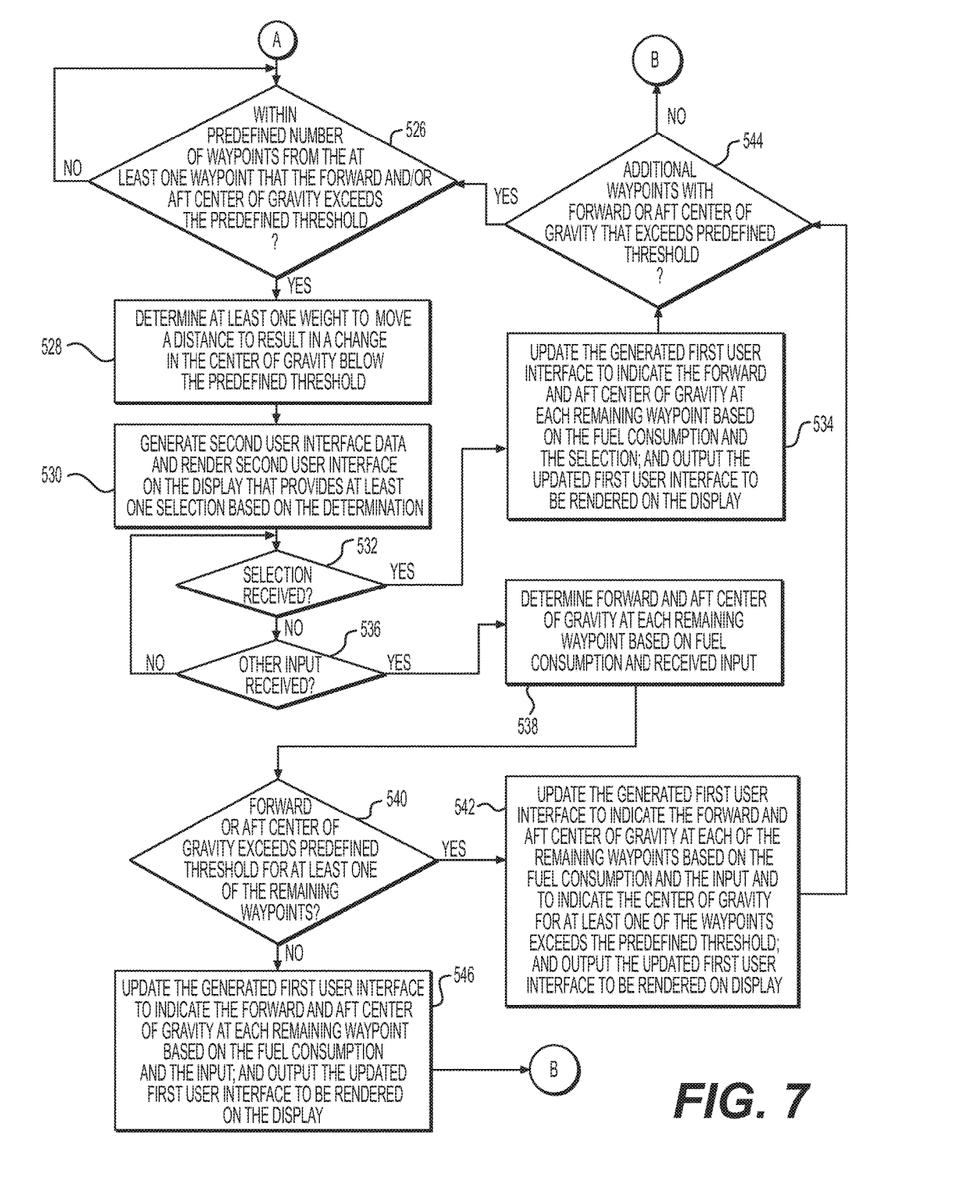
FIG. 7 is a continuation of the flowchart of FIG. 6.

Referring now to FIGS. 6 and 7, and with continued reference to FIGS. 1-5, a flowchart illustrates a control method 500 that can be performed by the center of gravity module 24 of FIGS. 1 and 2 in accordance with the present disclosure. As can be appreciated in light of the disclosure, the order of operation within the method is not limited to the sequential execution as illustrated in FIGS. 6 and 7 but may be performed in one or more varying orders as applicable and in accordance with the present disclosure.

In various embodiments, the method can be scheduled to run periodically or based on predetermined events, such as based on the receipt of the weight data 114.

The method begins at 502. At 504, the method receives the weight data 114 from the one or more weight sensors 26. At 506, the method processes the weight data 114 to determine the initial weight of the aircraft 10 and determines the initial values of the forward and aft center of gravity of the aircraft 10 based on equations (1) and (2). At 508, the method receives the flight plan data 118, including the one or more waypoints, from the flight management system 36. At 510, the method receives the fuel data 112 and the fuel consumption data 116 as determined by the flight management system 36. At 512, the method determines the change in the weight of the aircraft 10 at each waypoint, and based on this determination, computes the forward and aft center of gravity for the aircraft 10 at each waypoint based on equations (1) and (2).

At 514, the method determines whether the forward or the aft center of gravity exceeds the predefined threshold for the acceptable value for one or more of the waypoints of the flight plan. If true, at 516, the method generates the first UI data 140 that illustrates or indicates the forward and aft center of gravity at each waypoint, and that indicates that the change in the forward and/or aft center of gravity for at least one of the waypoints exceeds the predefined threshold. The method outputs the first UI data 140 for the display 18 to render the first user interface 200, 300 on the display 18. The method proceeds to A on FIG. 7.

Otherwise, if the forward or the aft center of gravity does not exceed the predefined threshold for the acceptable value for one or more of the waypoints of the flight plan, at 518, the method generates the first UI data 140 that illustrates or indicates the forward and aft center of gravity at each waypoint and outputs the first UI data 140 for the display 18 to render the first user interface 200, 300 on the display 18.

At 520, the method determines whether input has been received that changes the forward and/or the aft center of gravity, such as input received via the user input devices 14. If true, the method loops to 514. Otherwise, at 522, the method determines, based on the navigation data 123 and the flight plan data 118, whether the aircraft 10 has reached the end of the flight plan. If true, the method ends at 524. Otherwise, the method loops to 520.

From A on FIG. 7, at 526, the method determines whether the aircraft 10 is at or within a predefined number of waypoints from the at least one waypoint in which the forward and/or aft center of gravity exceeds the predefined threshold. If true, the method proceeds to 528. Otherwise, the method loops.

At 528, the method determines at least one weight to move a distance to result in a change in the forward and/or aft center of gravity below the predefined threshold (i.e. the method determines the correction data 132). At 530, the method generates the second UI data 142 based on the selection data 138, and outputs the second UI data 142 to the display 18 for rendering the second user interface 400, which includes the selectable boxes 414 based on the selection data 138, the weight input box 404 and the distance input box 406 (FIG. 5).

At 532, the method determines whether the selection 122 has been received via the user input devices 14. If true, the method proceeds to 534. Otherwise, at 536, the method determines whether the input 126 has been received via the user input devices 14. If false, the method loops to 532. If true, at 538, the method determines the forward and aft center of gravity at each remaining waypoint based on the fuel consumption data 116 and the received input 126 (i.e. determines the adjusted CG waypoint data 124). At 540, the method determines whether the forward or aft center of gravity exceeds the predefined threshold for at least one of the remaining waypoints. If true, the method proceeds to 542. At 542, the method updates the first UI data 140 to indicate the change in the forward and the aft center of gravity at each of the remaining waypoints based on the fuel consumption and the received input, and to indicate that the forward and/or aft center of gravity for at least one of the waypoints exceeds the predefined threshold. The method also outputs the updated first UI data 140 to the display 18 to render an updated first user interface 200, 300 on the display 18. At 544, the method determines whether there are additional waypoints in which the forward and/or the aft center of gravity for the aircraft 10 exceeds the predefined threshold. If true, the method loops to 526. If false, the method proceeds to B on FIG. 6, and from B on FIG. 6, the method proceeds to 520.

If, at 540, the method determines that the forward or aft center of gravity does not exceed the predefined threshold for at least one of the remaining waypoints, at 546, the method updates the first UI data 140 to indicate the change in the forward and the aft center of gravity at each of the remaining waypoints based on the fuel consumption and the received input. The method also outputs the updated first UI data 140 to the display 18 to render an updated first user interface 200, 300 on the display 18. The method proceeds to B on FIG. 6.

If, at 532, the method determines the selection 122 was received, at 534, the method updates the first UI data 140 to indicate the change in the forward and the aft center of gravity at each of the remaining waypoints based on the fuel consumption and the selection. The method also outputs the updated first UI data 140 to the display 18 to render an updated first user interface 200, 300 on the display 18.

Thus, the system and method for managing a center of gravity of a vehicle, such as an aircraft, on a display associated with an aircraft, reduces pilot workload. By determining the forward and the aft center of gravity of the aircraft at each waypoint of a flight plan based on the fuel consumption between waypoints and generating the first user interface data for rendering the first user interface on the display, the pilot can easily discern how the forward and aft center of gravity changes over the flight plan and between waypoints, and further, the pilot can easily identify one or more waypoints where the forward and/or aft center of gravity exceeds a predefined threshold. In addition, the rendering of the second user interface on the display provides the pilot with selections that enable the pilot to change the center of gravity for a waypoint to bring the forward and/or aft center of gravity within the predefined threshold that is the acceptable value. By displaying the second user interface on the display, the pilot's workload is further reduced as the pilot may select one of the selectable boxes and does not need to calculate an amount of weight to move a particular distance to result in a desired change in the center of gravity. It should be noted that the second user interface need not be rendered on the display based on the position of the aircraft 10 relative to a waypoint, but rather, may also be rendered on the display based on a selection of a particular waypoint by the pilot on the first user interface with the user input device 14, for example.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for managing a center of gravity of a vehicle on a display associated with the vehicle, comprising:

determining, by a processor, an initial value of a forward center of gravity and an aft center of gravity for the vehicle prior to a start of a journey having a plurality of waypoints, and receiving a value for a consumption of a fuel by the vehicle between each waypoint of the journey from a source of data associated with the vehicle;

determining, by the processor, a change in the forward center of gravity and the aft center of gravity of the vehicle at each waypoint of the journey based on the initial value of the forward center of gravity and the aft center of gravity and the fuel consumed between each waypoint;

generating, by the processor, a first user interface for display on the display that illustrates the forward center of gravity and the aft center of gravity of the vehicle at one or more of the plurality of waypoints over the journey and that illustrates that the change in at least one of the forward center of gravity and the aft center of gravity for at least one of the one or more of the plurality of waypoints exceeds a predefined threshold;

rendering, by the processor, the first user interface on the display;

based on the change in the center of gravity for the at least one of the plurality of waypoints exceeding the predefined threshold, generating, by the processor, a second user interface for display on the display that provides a selection to bring the at least one of the forward center of gravity and the aft center of gravity below the predefined threshold at the at least one of the plurality of waypoints; and updating, by the processor, the generated first user interface based on a receipt of the selection.

2. The method of claim 1, wherein updating, by the processor, the generated first user interface further comprises:
determining a position of the vehicle on the journey; and
updating, by the processor, the generated first user interface based on the selection and the position of the vehicle on the journey.

3. The method of claim 1, wherein the second user interface comprises at least one input box, and the method further comprises:
receiving input from an input device associated with the vehicle; and
updating, by the processor, the generated first user interface based on the received input.

4. The method of claim 1, wherein generating, by the processor, the second user interface for display on the display further comprises:
determining, by the processor, based on the change in the center of gravity for the at least one of the plurality of waypoints exceeding the predefined threshold, at least one weight to move a distance to result in a change of the at least one of the forward center of gravity and the aft center of gravity to a value below the predefined threshold, and the selection is based on the determining.

5. The method of claim 1, wherein generating, by the processor, the second user interface for display on the display further comprises:
determining a position of the vehicle on the journey; and
rendering the second user interface on the display based on the position of the vehicle.

6. The method of claim 1, wherein the first user interface is rendered on a vertical situation display.

7. The method of claim 1, wherein the first user interface is rendered on a flight planning page display.

8. A system for managing a center of gravity of a vehicle on a display associated with the vehicle, comprising:
a source of a position of the vehicle;
a source of journey data and fuel consumption data for the vehicle along the journey, the journey having a plurality of waypoints;
a processor onboard the vehicle and in communication with the display, and the processor:
determines a forward center of gravity and an aft center of gravity of the vehicle at each waypoint of the journey based on an initial value of the forward center of gravity and the aft center of gravity and the fuel consumption data;
generates first user interface data that indicates the forward center of gravity and the aft center of gravity of the vehicle at each of the plurality of waypoints over the journey and that indicates that at least one of the forward center of gravity and the aft center of gravity for at least one of the plurality of waypoints exceeds a predefined threshold;
renders a first user interface on the display based on the first user interface data;
determines the position of the vehicle on the journey;
generates, based on the position of the vehicle and the at least one of the forward center of gravity and the aft center of gravity for the at least one of the plurality of waypoints exceeding the predefined threshold, second user interface data that provides a selection to bring the at least one of the forward center of gravity and the aft center of gravity below the predefined threshold at the at least one of the plurality of waypoints;
renders a second user interface on the display based on the second user interface data; and
updates the generated first user interface based on a receipt of the selection.

9. The system of claim 8, wherein the first user interface data indicates whether the forward center of gravity or the aft center of gravity for at least one of the plurality of waypoints is near the predefined threshold.

10. The system of claim 8, wherein the second user interface includes at least one input box that receives input data from an input device associated with the vehicle.

11. The system of claim 10, wherein the processor updates the generated first user interface based on a receipt of the input data.

12. The system of claim 8, wherein the selection is at least one weight to move a distance to result in a change of the at least one of the forward center of gravity and the aft center of gravity to a value below the predefined threshold, the at least one weight determined by the processor based on the at least one of the forward center of gravity and the aft center of gravity for the at least one of the plurality of waypoints exceeding the predefined threshold.

13. A computer program product for processing a digital signal, comprising:
a tangible storage medium readable by a processing circuit and storing instructions for execution by the processing circuit for performing a method for managing a center of gravity of a vehicle on a display associated with the vehicle, comprising:
determining an initial value of a forward center of gravity and an aft center of gravity for the vehicle prior to a start of a journey having a plurality of waypoints, and receiving a value for a consumption of a fuel by the vehicle between each waypoint of the journey from a source of data associated with the vehicle;
determining a change in the forward center of gravity and the aft center of gravity of the vehicle at each waypoint of the journey based on the initial value of the forward center of gravity and the aft center of gravity and the fuel consumed between each waypoint;
generating a first user interface for display on the display that illustrates the forward center of gravity and the aft center of gravity of the vehicle at each of the plurality of waypoints over the journey and that illustrates that the change in at least one of the forward center of gravity and the aft center of gravity for at least one of the plurality of waypoints exceeds a predefined threshold;
rendering the first user interface on the display;
based on the change in the at least one of the forward center of gravity and the aft center of gravity for the at least one of the plurality of waypoints exceeding the predefined threshold, determining at least one weight to move a distance to result in a change of the at least one of the forward center of gravity and the aft center of gravity to a value below the predefined threshold and generating a second user interface for display on the display that provides a selection based on the determining of the at least one weight; and
updating the generated first user interface based on a receipt of the selection.

14. The computer program product of claim 13, wherein generating the second user interface for display on the display further comprises:
determining a position of the vehicle on the journey; and rendering the second user interface on the display based on the position of the vehicle.

15. The computer program product of claim 14, wherein updating the generated first user interface further comprises updating the generated first user interface based on the selection and the position of the vehicle on the journey.

16. The computer program product of claim 14, further comprising:
   receiving an input to an input box associated with the second user interface; and
   updating the generated first user interface based on the received input.

* * * * *